Figure 1:
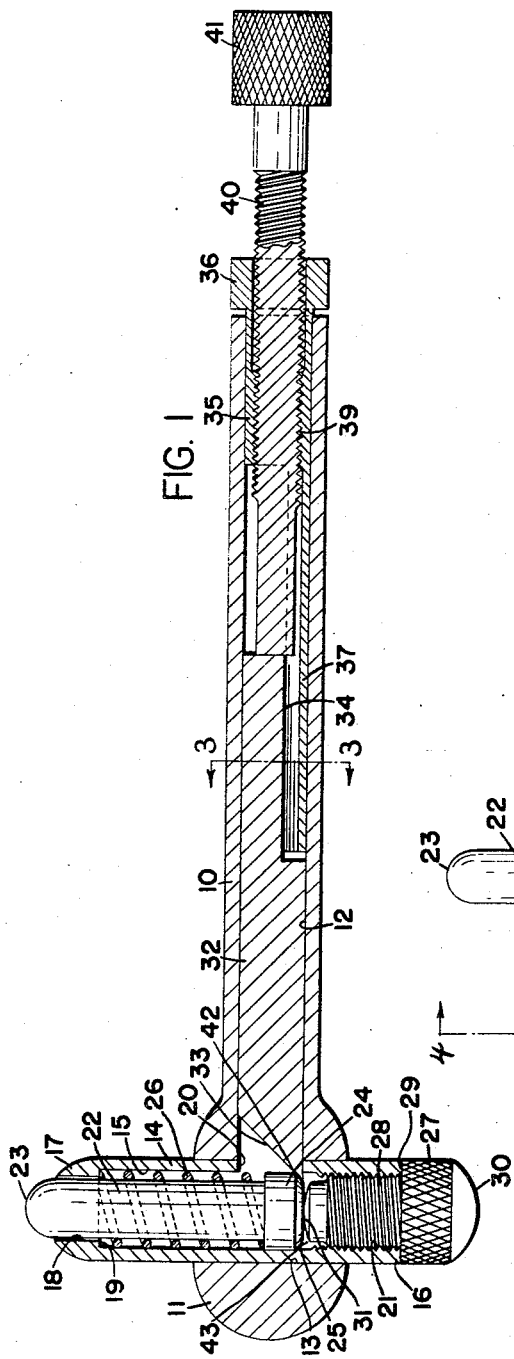

Aug. 13, 1957

C. R. MARTIN 2,802,274

TELESCOPING GAUGE

Filed Oct. 19, 1953

2 Sheets-Sheet 1

INVENTOR.
CHARLES R. MARTIN

BY Ely, Frye & Hamilton

ATTORNEYS

Aug. 13, 1957  C. R. MARTIN  2,802,274
TELESCOPING GAUGE
Filed Oct. 19, 1953  2 Sheets-Sheet 2

INVENTOR.
CHARLES R. MARTIN
BY Ely, Frye & Hamilton

ATTORNEYS

United States Patent Office 2,802,274
Patented Aug. 13, 1957

2,802,274

TELESCOPING GAUGE

Charles R. Martin, Wooster, Ohio

Application October 19, 1953, Serial No. 386,908

7 Claims. (Cl. 33—163)

This invention relates to improvements in telescoping gauges of the type used to measure inside diameters.

An object of the invention is to provide a gauge of the telescoping type of novel and improved construction which may be quickly and easily operated to accurately gauge inside diameters over a relatively wide range of sizes which may be checked subsequently on a suitable measuring scale.

Another object is to provide a gauge having a minimum of parts while providing for instant and accurate adjustment of the movable parts as determined by the size of the inside diameters being measured.

A further object is to provide a telescoping gauge which in use employs a fixed threaded anvil at one end of the head and a spring opposed movable anvil at its other end, the latter anvil being movable in either direction only upon movement of a cam-faced plunger whose movement is quickly and accurately controlled by a threaded operating member which will instantly cause or halt movement of the plunger as desired.

A further object is to provide novel means for insuring nonrotating movement of the plunger.

A further object is to provide a gauge wherein a plurality of interchangeable fixed anvils may be employed with one or more interchangeable movable anvils to enable the device to be used over a relatively wide range of inside diameters to be measured, without affecting the operation of the remaining parts of the device.

Other objects and advantages will become apparent from the following description taken in conjunction with the accompanying drawings.

Figure 2:
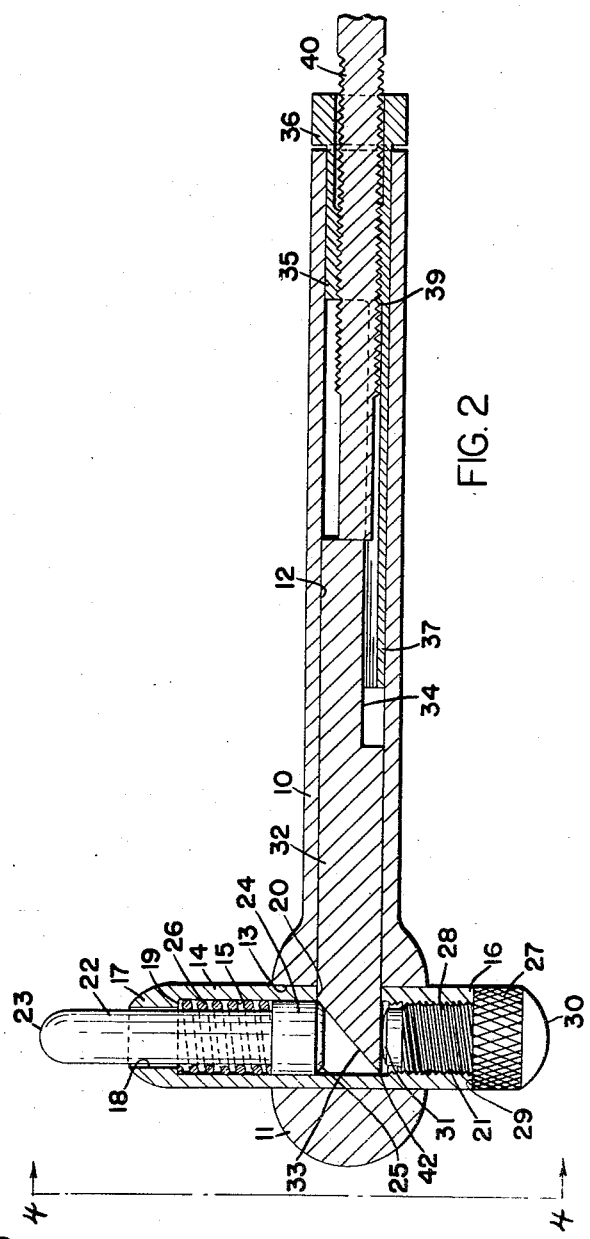
Figure 3:
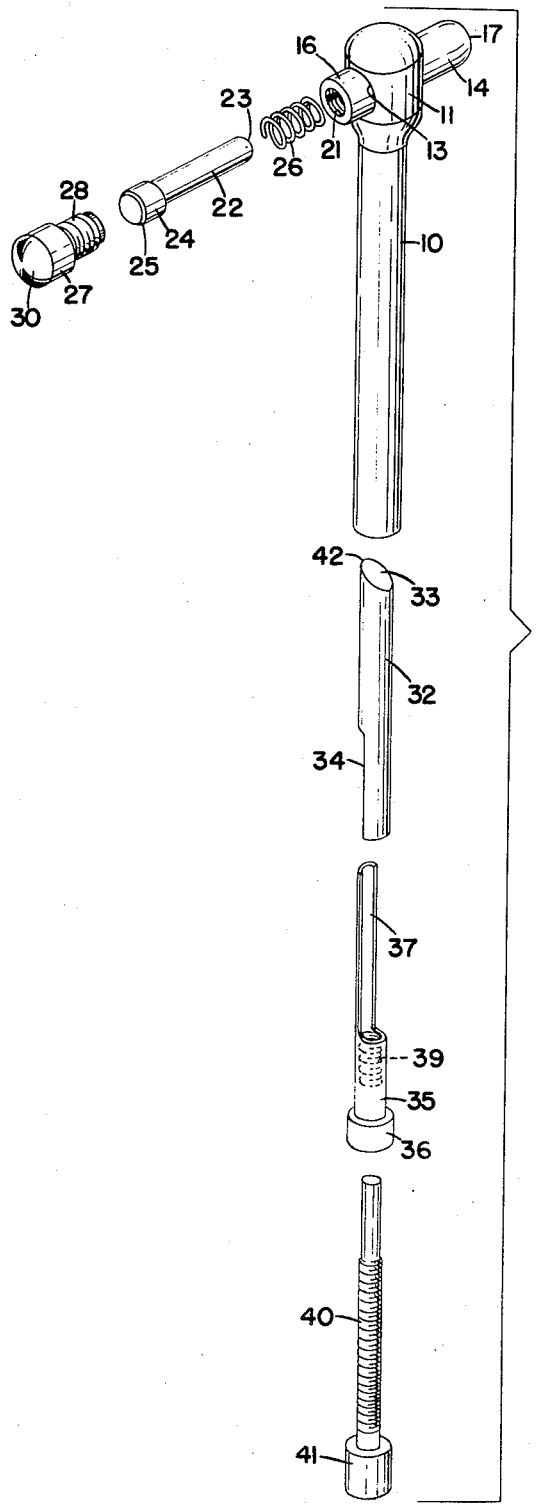
Figure 3:
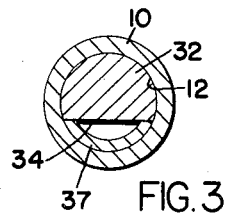
Figure 4:
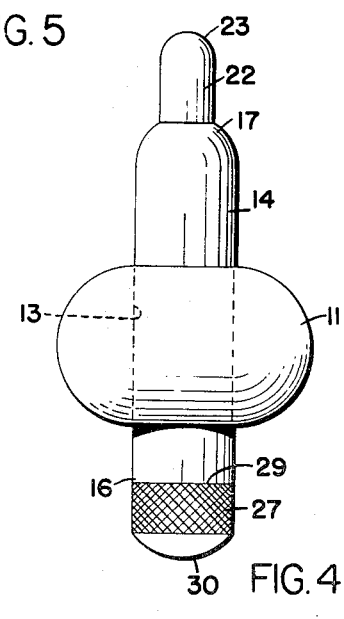

In the drawings:

Fig. 1 is an enlarged longitudinal section with the plunger in almost its most rearward position, Fig. 2 is a similar view with the plunger in its most forward position, Fig. 3 is a section taken substantially on line 3—3 of Fig. 1, Fig. 4 is an end elevation taken substantially in the direction indicated by line 4—4 of Fig. 2, and Fig. 5 is a perspective view of the parts of the device in unassembled relation.

Referring to the drawings, the numeral 10 indicates a relatively long tubular body portion having an enlarged forward end portion 11. The body 10 has a central longitudinal bore 12 extending from its rear end into its forward end 11 where it meets a larger transverse bore 13 formed in the end portion 11.

A tubular head 14 is press fitted or welded or otherwise suitably secured in the bore 13 so that both ends of the head 14 extend a substantial distance laterally of end portion 11, but these ends need not necessarily be equidistant from end portion 11, the arrangement being such, however, that head 14 is fixed at an angle of 90° with respect to body 10. Head 14 has a central longitudinal bore 15 extending from one end portion 16, to a location adjacent its other end 17, at which location the bore is reduced in size as at 18, to provide an inner shoulder 19 in the head. As shown the outer surface of end 17 of the head is given a partially rounded effect. To permit communication between the bores 12 and 15, the head 14 has an opening 20 therein in alignment with and of the same diameter as bore 12. End portion 16 of the head is interiorly threaded as at 21, to a location adjacent the meeting area of bores 12 and 15.

Mounted for longitudinal movement in the bore 15 is a movable anvil 22 of a diameter slightly less than the diameter of the reduced bore 18 so that the anvil will move readily in the latter bore. The outer end of the anvil is rounded as at 23, while its inner end has an enlarged head 24 of a diameter slightly less than the diameter of bore 15 so as to be readily movable in the latter bore, and the inner end of head 24 is tapered as at 25 at an angle of approximately 45°. Surrounding anvil 22 in the bore 15 is a coil spring 26, one end of which bears against shoulder 19, while the opposite end bears against head 24, said spring having a normal bias urging anvil 22 inwardly of head 14.

A fixed anvil with a body portion 27 has a threaded stem portion 28 which is threaded into end portion 16 of head 14 until the shoulder 29 on the anvil engages the flat end face of head 14. The outer end of anvil 27 is rounded as at 30, while its inner end is slightly rounded as at 31. Also, the anvil 27 may be knurled as indicated for ease of handling.

To assemble the two anvils in the head 14, the spring 26 is first moved into bore 15 from the direction of end 16 until one end of the spring contacts shoulder 19. Then anvil 22 is pushed through spring 26 and reduced bore 18 until head 24 engages the opposite end of the spring. Thereafter anvil 27 is threaded into position with its inner end 31 contacting head 24 of anvil 22 and moving the latter anvil to the position indicated in Fig. 1, in which position the spring 26 will be slightly compressed, and the outer end 23 of anvil 22 will extend slightly outwardly of head 14.

In order to control the movement of anvil 22, I mount for longitudinal movement in body 10, a generally cylindrical plunger 32, the forward end of which has a cam face 33 arranged at an angle of approximately 45° with respect to the axis of the plunger, while the opposite end of the plunger has a flattened area 34, the purpose of which will be later explained. At the rear end of the body 10, a generally tubular sleeve 35 is press fitted or otherwise permanently secured in bore 12, with the rear end of the sleeve terminating in an enlarged head 36 located rearwardly of body 10 and preferably of the same outside diameter as the latter. Sleeve 35 has a forward end portion 37 that is only partly annular and this arcuate portion 37 extends under the flattened area 34 of plunger 32, so that during longitudinal movement of plunger 32 it is impossible for the plunger to rotate because the fixed arcuate portion 37 of the sleeve engaging the flattened area 34 prevents such rotation. However, the overlapping relation between flattened area 34 and arcuate portion 37 does not interfere with longitudinal movement of the plunger. The tubular portion of sleeve 35 is interiorly threaded for a portion of its length, as indicated at 39, although the entire tubular portion can be so threaded if desired.

Longitudinal movement of plunger 32 is controlled by a threaded operating member 40 having a knurled head 41 to facilitate turning the member. Member 40 extends through the sleeve 35 and is in threaded engagement with the threaded portion 39 of the sleeve, while the forward end of the member engages the rear end of plunger 32.

When the parts of the device are initially assembled, the plunger 32 is inserted into bore 12 through the rear end of body 10, thereafter the threaded sleeve 35 is press fitted permanently into proper position in the rear of body 10, and then member 40 is threaded into operating position. Thus, the sleeve 35 permanently retains the plunger against removal from the body 10, without interfering with normal longitudinal movement of the plunger in response to turning movement of the member 40.

Fig. 1 shows all of the parts of the device in assembled position ready for use with the adjacent ends of anvils 22 and 27 in engagement. At this time the plunger is moved forward until the forward end portion 42 of the cam face 33 extends into the space 43 which is formed between the anvils adjacent their contacting surfaces by virtue of the taper 25 on anvil 22 and the rounded end 31 on anvil 27. Now as member 40 is rotated, the plunger will move forward and the cam face 33 acting against the tapered end 25 of anvil 22 will move the latter anvil outwardly against the action of spring 26, while the lower face (as viewed in Figs. 1 and 2) of the plunger engages the fixed inner end 31 of anvil 27. Forward movement of the plunger can be continued until it reaches approximately the position shown in Fig. 2, at which time anvil 22 will have moved outwardly as far as it can go.

Because of the threaded engagement between member 40 and sleeve 35 the spring 26 cannot by itself cause opposite movement of anvil 22 and the plunger from their Fig. 2 positions, but if member 40 is rotated in the opposite direction, the spring 26 will force head 24 inwardly along cam face 33 and move the plunger rearwardly in response to rearward movement of the member 40.

Thus it will be seen that the member 40 controls movement of the plunger and an anvil in both directions, assisted by the spring 26 during the return movement. This arrangement permits very fine adjustment of the device and gives absolute control over the movements of anvil 22, since this anvil can only move in either direction while member 40 is being rotated and must remain stationary as soon as rotation of member 40 is stopped. Consequently, when an inside diameter is to be measured which is greater than the distance between anvil ends 23 and 30, as indicated in Fig. 1, but which is not more than such distance, as indicated in Fig. 2, an operator can insert the anvils transversely into the opening to be measured, and by rotating member 40, anvil 22 can be moved until simultaneous engagement with the wall of the opening is noted, either by observation or feeling, between the ends 23 and 30 of the anvils, after which rotation of member 40 is stopped. The anvils are then removed from the opening and the distance between anvil ends 23 and 30 accurately measured on a suitable scale.

Another feature of the device is that the construction is adapted to the use of quickly interchangeable anvils without affecting the operation of the plunger and member 40, to thereby increase the range of inside diameters that can be measured with the device. For example, we will assume that the anvils shown will take care of distances from .990 inch (Fig. 1) to 1.155 inches (Fig. 2). Now by using the same anvil 22 while using a plurality of additional anvils 27, each of which has body portions of gradually increasing length, but with uniform stem portions 28, I can greatly increase the utility of the device. Thus by threading any of the interchangeable anvils 27 into the head 14, the device is ready for instant use without affecting any of the other parts.

Likewise, anvil 22 may be interchanged with other similar anvils having body portions of gradually increasing length, so that actually the device can be used over as wide a range of diameters as any number of anvils used will permit. When an interchange of anvils 22 is made, this may readily be accomplished without affecting the plunger or member 40.

While I have shown and described a preferred embodiment of my invention, it will be apparent that the invention is not limited thereto, and that modifications and changes may be made therein without departing from the spirit of the invention or from the scope of the subjoined claims.

What is claimed is:

1. A gauge of the character described comprising an elongated body or the like having a first longitudinal bore, a transverse head on said body and having a second longitudinal bore communicating with said first bore, a fixed anvil threaded into one end of said second bore and having its outer end extending outwardly of said head, the inner end of said anvil being rounded and lying adjacent said first bore, a movable anvil mounted in the other end of said second bore, a spring in said second bore surrounding said movable anvil and adapted to move said movable anvil longitudinally inwardly of said head, the inner end of said movable anvil being tapered and engaging the inner end of said fixed anvil at the end of its movement inwardly, a substantially cylindrical plunger mounted for longitudinal rearward and forward movement in said first bore and having a cam face on its forward end movable to wedge itself between said anvils during forward movement of said plunger to separate said anvils and move said movable anvil outwardly against the action of said spring, an interiorly threaded sleeve permanently fixed in said first bore adjacent the rear end thereof, and an operating member threaded into said sleeve to engage the rear end of said plunger and move the latter forward upon rotation of said member, said spring constituting the only spring means utilized in the operation of the gauge.

2. A gauge as defined in claim 1 wherein the rear end of said plunger has a flattened area, and said sleeve has a forwardly extending arcuate portion in engagement with said flattened area to prevent rotation of said plunger.

3. In a gauge for measuring inside diameters, the combination of a generally tubular elongated body, a transverse head on the forward end of said body having a longitudinal bore, a fixed anvil threaded into one end of said bore and extending outwardly of said head, a movable anvil mounted for inward and outward longitudinal movement in the other end of said bore and extending outwardly of said head, a coil spring in said bore surrounding said movable anvil and holding the latter in engagement with said fixed anvil when said movable anvil is at the inner end of its movement, a longitudinally movable, substantially cylindrical cam member in said body having a flat, angular cam face on its forward end movable into and out of wedging relation between said anvils to separate said anvils during forward movement of said cam member, and cooperating with said spring to move said movable anvil in opposite directions upon longitudinal movement of said cam member, an interiorly threaded sleeve permanently fixed in said body adjacent the rear end thereof, and an operating member threaded into said sleeve and engaging the rear end of said cam member to move the latter longitudinally forward, said movable anvil being incapable of movement by said spring without initial movement of said operating member, and said spring constituting the sole spring means utilized in the operation of the gauge.

4. A gauge as defined in claim 3 wherein the rear end of said cam member has a flattened area, and said sleeve has an arcuate portion that engages said flattened area to prevent rotation of said cam member during its longitudinal movement.

5. A gauge as defined in claim 3 wherein additional anvils may be interchanged with the fixed and movable anvils without affecting the operation of said cam member and said operating member, and without removal of said head, said cam member and said operating member.

6. A gauge of the character described comprising an elongated generally tubular body having an enlarged forward end portion and having a first longitudinal bore extending from its rear end to a location within said forward end portion, said latter portion having a transverse second bore extending therethrough and communicating with the forward end of said first bore, an interiorly threaded sleeve permanently secured in said first bore adjacent the rear end of said body and having a forwardly extending arcuate portion, a generally tubular head secured in said transverse second bore and extending laterally on both sides of said forward end portion of said body, said head having a longitudinal bore extending therethrough which communicates with the forward end of said first bore, a fixed anvil threaded into one end of said bore in said head and extending outwardly of said head, the inner end of said anvil being rounded and lying adjacent said first bore, a movable anvil mounted in the other end of said bore in said head and extending outwardly of said head, a single coil spring surrounding said movable anvil inside said head and having a normal bias holding said movable anvil in engagement with said fixed anvil when said movable anvil is at the inner end of its movement, a longitudinally movable, substantially cylindrical cam member in said first bore having a flat, angular cam face on its forward end adapted to wedge itself between said anvils during forward longitudinal movement of said cam member to separate said anvils and move said movable anvil outwardly against the action of said spring, said cam member having a flattened area on its rear end portion that is in engagement with said arcuate portion of said sleeve to prevent rotation of said cam member during its longitudinal movement, and an operating member in threaded engagement with said sleeve and engaging the rear end of said cam member to move the latter longitudinally forward, said spring constituting the sole spring means utilized in the operation of the gauge.

7. A gauge of the character described comprising an elongated generally tubular body having an enlarged forward end portion and having a first longitudinal bore extending from its rear end to a location within said forward end portion, said latter portion having a transverse second bore extending therethrough and communicating with the forward end of said first bore, an interiorly threaded sleeve permanently secured in said first bore adjacent the rear end of said body and having a forwardly extending arcuate portion, a generally tubular head secured in said transverse second bore and extending laterally on both sides of said forward end portion of said body, said head having a longitudinal bore extending therethrough which communicates with the forward end of said first bore, a fixed anvil threaded into one end of said bore in said head and extending outwardly of said head, the inner end of said anvil being rounded and lying adjacent said first bore, a movable anvil mounted in the other end of said bore in said head and extending outwardly of said head, a single coil spring surrounding said movable anvil inside said head and having a normal bias holding said movable anvil in engagement with said fixed anvil when said movable anvil is at the inner end of its movement, a longitudinally movable, substantially cylindrical cam member in said first bore having a flat, angular cam face on its forward end movable into and out of wedging relation between said anvils to separate said anvils during forward movement of said cam member and to move said movable anvil outwardly against the action of said spring, and to reduce the force against said spring during rearward movement of said cam member whereby said spring will move said movable anvil inwardly and said cam member rearwardly to return said anvils into engagement with each other, said cam member having a flattened area on its rear end portion that is in engagement with said arcuate portion of said sleeve to prevent rotation of said cam member during its longitudinal movement, and an operating member in threaded engagement with said sleeve and engaging the rear end of said cam member to move the latter longitudinally forward, said spring constituting the sole means for moving said movable anvil inwardly and said cam member rearwardly.

References Cited in the file of this patent

UNITED STATES PATENTS

| | | |
|---|---|---|
| 2,135,912 | Rae | Nov. 8, 1938 |
| 2,424,497 | Nillson | July 22, 1947 |
| 2,601,496 | Boat | June 24, 1952 |
| 2,663,942 | Rudolph | Dec. 29, 1953 |